United States Patent
Bansal et al.

(10) Patent No.: US 10,621,319 B2
(45) Date of Patent: Apr. 14, 2020

(54) DIGITAL CERTIFICATE CONTAINING MULTIMEDIA CONTENT

(71) Applicant: INTERNATIONAL BUSINESS MACHINES CORPORATION, Armonk, NY (US)

(72) Inventors: Rinkesh I. Bansal, Pune (IN); Sanjay B. Panchal, Mumbai (IN); Chintan Thaker, Pune (IN); Vinod A. Valecha, Pune (IN)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 15/810,291

(22) Filed: Nov. 13, 2017

(65) Prior Publication Data
US 2019/0147150 A1 May 16, 2019

(51) Int. Cl.
| | | |
|---|---|---|
| H04L 9/32 | (2006.01) | |
| G06F 21/32 | (2013.01) | |
| G06F 21/33 | (2013.01) | |
| G06F 21/64 | (2013.01) | |

(52) U.S. Cl.
CPC .............. *G06F 21/32* (2013.01); *G06F 21/33* (2013.01); *G06F 21/64* (2013.01); *H04L 9/321* (2013.01); *H04L 9/3231* (2013.01); *H04L 9/3247* (2013.01); *H04L 9/3263* (2013.01); *H04L 2209/56* (2013.01); *H04L 2209/60* (2013.01)

(58) Field of Classification Search
CPC .......... G06F 21/32; G06F 21/33; G06F 21/64; H04L 9/3231; H04L 2209/56; H04L 2209/60; H04L 9/3263; H04L 9/3247; H04L 9/321

USPC .......................................................... 713/170
See application file for complete search history.

(56) References Cited

U.S. PATENT DOCUMENTS

| | | | |
|---|---|---|---|
| 6,175,626 B1 | 1/2001 | Aucsmith et al. | |
| 7,017,046 B2 | 3/2006 | Doyle et al. | |
| 2004/0168055 A1* | 8/2004 | Lord | H04L 63/0823 |
| | | | 713/156 |

(Continued)

FOREIGN PATENT DOCUMENTS

WO 0205148 A1 1/2002

OTHER PUBLICATIONS

Jo et al., "Biometric Digital Signature Key Generation and Cryptography Communication Based on Fingerprint", F.P. Preparata and Q. Fang (Eds.): FAW 2007, LNCS 4613, pp. 38-49.

(Continued)

*Primary Examiner* — Mohammad W Reza
(74) *Attorney, Agent, or Firm* — Kenneth Han

(57) ABSTRACT

Utilizing multimedia content in a digital signature to facilitate authentication. A message requester public key is received from a message requester. A digital certificate is generated containing the message requester public key. Multimedia content identifying the message requester is retrieved. Multimedia content is inserted into the digital certificate. A message digest is generated from the digital certificate including the multimedia content. The message digest and included multimedia content is encrypted with a certificate authority private key to generate a digital signature. A certificate authority public key is retrieved. The digital certificate including the digital signature and certificate authority public key is transmitted to a message owner.

20 Claims, 8 Drawing Sheets

(56) References Cited

U.S. PATENT DOCUMENTS

| | | |
|---|---|---|
| 2009/0187764 A1 | 7/2009 | Astakhov et al. |
| 2010/0211793 A1* | 8/2010 | Park .................. H04N 7/162 |
| | | 713/176 |
| 2012/0060039 A1 | 3/2012 | Leclercq |
| 2013/0019093 A1 | 1/2013 | Seidl et al. |

OTHER PUBLICATIONS

Chung et al., "Biometric Certificate based Biometric Digital Key Generation with Protection Mechanism", Frontiers in the Convergence of Bioscience and Information Technologies, 2007, pp. 1-6.

Mell et al., "The NIST Definition of Cloud Computing", National Institute of Standards and Technology, Special Publication 800-145, Sep. 2011, pp. 1-7.

Kwon et al., "Practical Digital Signature Generation Using Biometrics", A. Lagana et al. (Eds.): ICCSA 2004, LNCS 3043, 2004, pp. 728-737.

* cited by examiner

DIGITAL CERTIFICATE CONTAINING MULTIMEDIA CONTENT

BACKGROUND

The present invention relates generally to the field of digital signatures, and more particularly to the transmission of encrypted messages utilizing digital signatures with multimedia content.

BRIEF SUMMARY

Embodiments of the present invention disclose a method, system, and computer program product for utilizing multimedia content in a digital signature to facilitate authentication. A message requester public key is received from a message requester. A digital certificate is generated including the message requester public key. Multimedia content is retrieved identifying the message requester. Multimedia content inserted into the digital certificate. A message digest is generated from the digital certificate including the multimedia content. The message digest and included multimedia content is encrypted with a certificate authority private key to generate a digital signature. A certificate authority public key is retrieved. The digital certificate including the digital signature and certificate authority public key is transmitted to a message owner.

DETAILED DESCRIPTION

Transmission and authentication of messages as well as all data via networks such as the Internet continues to grow in importance. Since at least the 1970's, private and public key encryption schemes, combined more recently with digital certificates issued by certificate authorities confirming the validity of distributed public keys are heavily utilized to maintain the security of these messages and other data. As the sophistication of cybercriminals increases, however, and the number of clever ways of obtaining access to secure data also increases, a need exists for a more secure way of ensuring that private and public key encryption schemes remain secure in the twenty-first century when transmitting and authenticating messages over the internet. Presented is a method, system, and computer program product to transmit encrypted messages utilizing digital signatures with multimedia content.

Embodiments of the invention are directed to a system for secure transmission of encrypted messages utilizing digital signatures with multimedia content. The present invention may be utilized in any situation where a public/private key encryption scheme is utilized to secure between computers connected via a network, encrypted transmission of files, programs, e-mails, financial transaction information, chat messages, key(s) for generation of a secure socket layer between the computers, key for generation of any other symmetric encryption scheme, and/or any other computerized data. Since the applications of the presently disclosed invention are diverse, the data for secure transmission, as previously described, is collectively referred to herein as a "message" or collectively "messages." As used herein, the computer distributing its public key via a certificate authority is referred to as the "message requester," and the public key distributed on behalf of the message requester is referred to as the "message requester public key." The computer which is the original source of the data that will be securely transferred as "messages" is referred as the "message owner."

Figure 1:
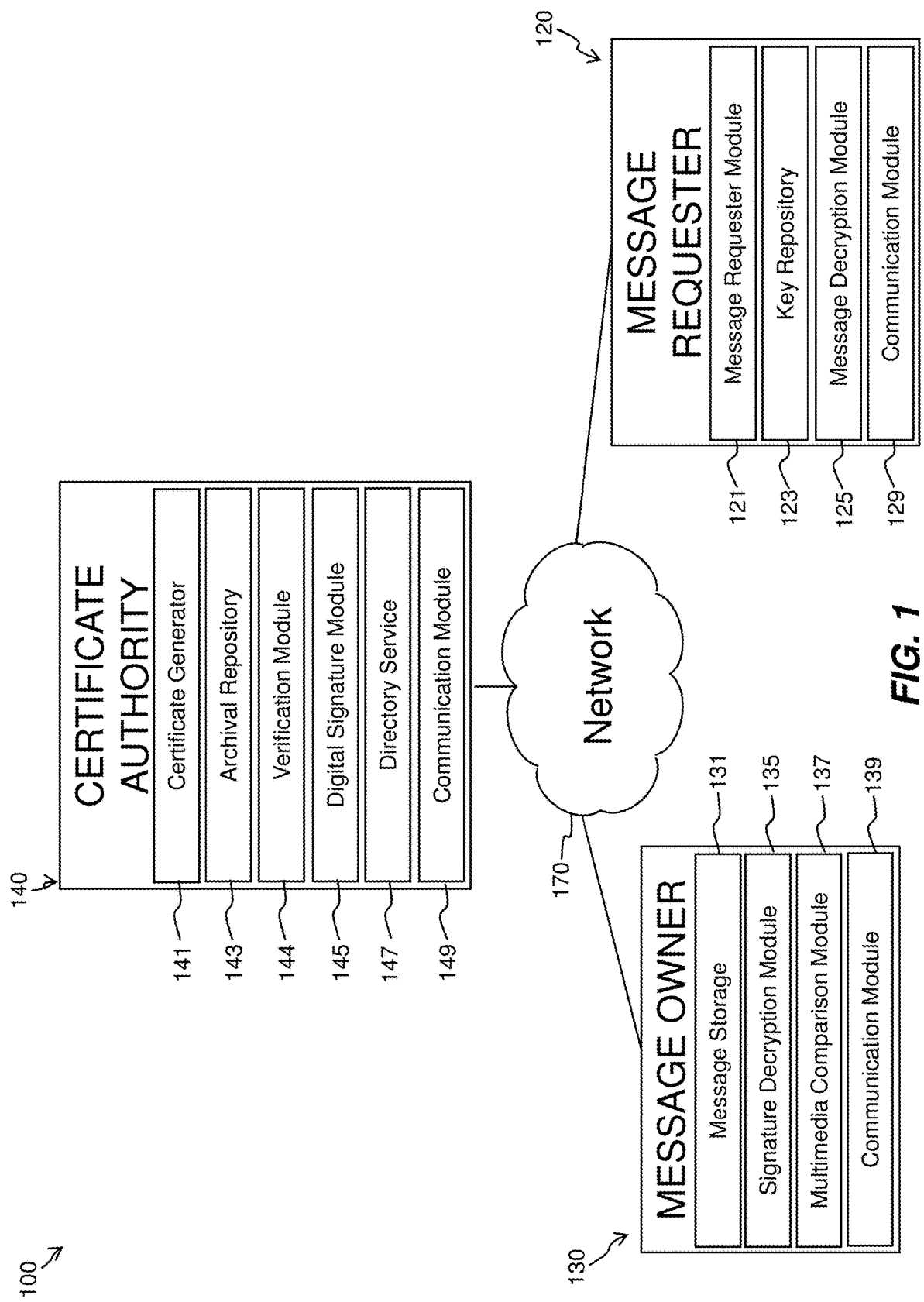
FIG. 1 is a functional block diagram illustrating an environment for transmission of encrypted messages utilizing digital signatures with multimedia content, in accordance with an embodiment of the present invention.

FIG. 1 is a functional block diagram illustrating an environment 100 for transmission of encrypted messages utilizing digital signatures with multimedia content, in accordance with an embodiment of the invention. In an exemplary embodiment, a message requester 120 requests files, programs, e-mails, financial transaction information, chat messages, key for generation of a secure socket layer/ symmetric encryption scheme, or any other computerized data for secure transmission such as described (a "message" or collectively "messages," as discussed previously) from message owner 130. The request for messages from message requester 120 may occur automatically, such as resulting from a daemon associated with an e-mail program seeking new e-mails in a secure fashion, or software seeking updates for an operating system requiring secure transmission of files for updating the operating system without need to fear of viruses, malware, or hijacks. The request for messages from message requester 120 may be activated by a user actively seeking messages such as banking information from a banking website, software for download from a file share server, etc. The messages are maintained originally by message owner 130. With regard to the previous examples, the message owner 130 is an e-mail server, a software manufacturer website, the banking website, or the file share server.

To ensure secure transmission of the messages from the message owner 130 to the message requester 120, a certificate authority 140 generates digital certificates, as further discussed herein, containing a message requester public key which is used to ensure secure transmission of the messages from the message owner 130 to the message requester 120 and transmits the digital certificates including the message requester public key to the message owner 130, which utilizes the message requester public key in encrypting messages for transmission to the message requester 120, as further discussed herein. All of message requester 120, message owner 130, and certificate authority 140 are connected via network 170.

In various embodiments, network 170 represents, for example, an internet, a local area network (LAN), a wide area network (WAN) such as the Internet, and includes wired, wireless, or fiber optic connections. In general, network 170 may be any combination of connections and protocols that will support communications between message requester 120, message owner 130, and certificate authority 140, in accordance with an embodiment of the invention.

In various embodiments, message requester 120, message owner 130, and certificate authority 140 may be, for example, a mainframe or a mini computer, a terminal, a laptop, a tablet, a netbook personal computer (PC), a mobile device, a desktop computer, or any other sort of computing device, in accordance with embodiments described herein. Message requester 120, message owner 130, and certificate authority 140 may include internal and external hardware components as depicted and described further in detail with reference to FIG. 5, below. In other embodiments, each of message requester 120, message owner 130, and certificate authority 140 may be implemented in a cloud computing environment, as described in relation to FIGS. 6 and 7, below. In a still further embodiment, some or all of message requester 120, message owner 130, and certificate authority 140 are embodied in physically the same computing device, with all communications between various components internally.

Message requester 120, message owner 130, and certificate authority 140, in effect, represent any sort of computing device possessing sufficient processing power to execute software to be utilized in transmission of encrypted messages utilizing digital signatures with multimedia content. Computing devices associated with message requester 120, message owner 130, and certificate authority 140 may, in transmitting encrypted messages, utilize a hosted workload 96 as displayed in connection with FIG. 7 below, and/or perform other tasks as further described herein.

In the exemplary embodiment, message requester 120 includes a message requester module 121, a key repository 123, a message decryption module 125, and a communication module 129.

Message requester module 121 represents software and/or hardware installed on message requester 120 for requesting transmission of a message or messages from message owner 130. In alternate embodiments involving automated transmission of messages to message requester 120 from message owner 130 (without the need for a specific request), the message requester module 121 may not be present or not utilized.

Figure 5:
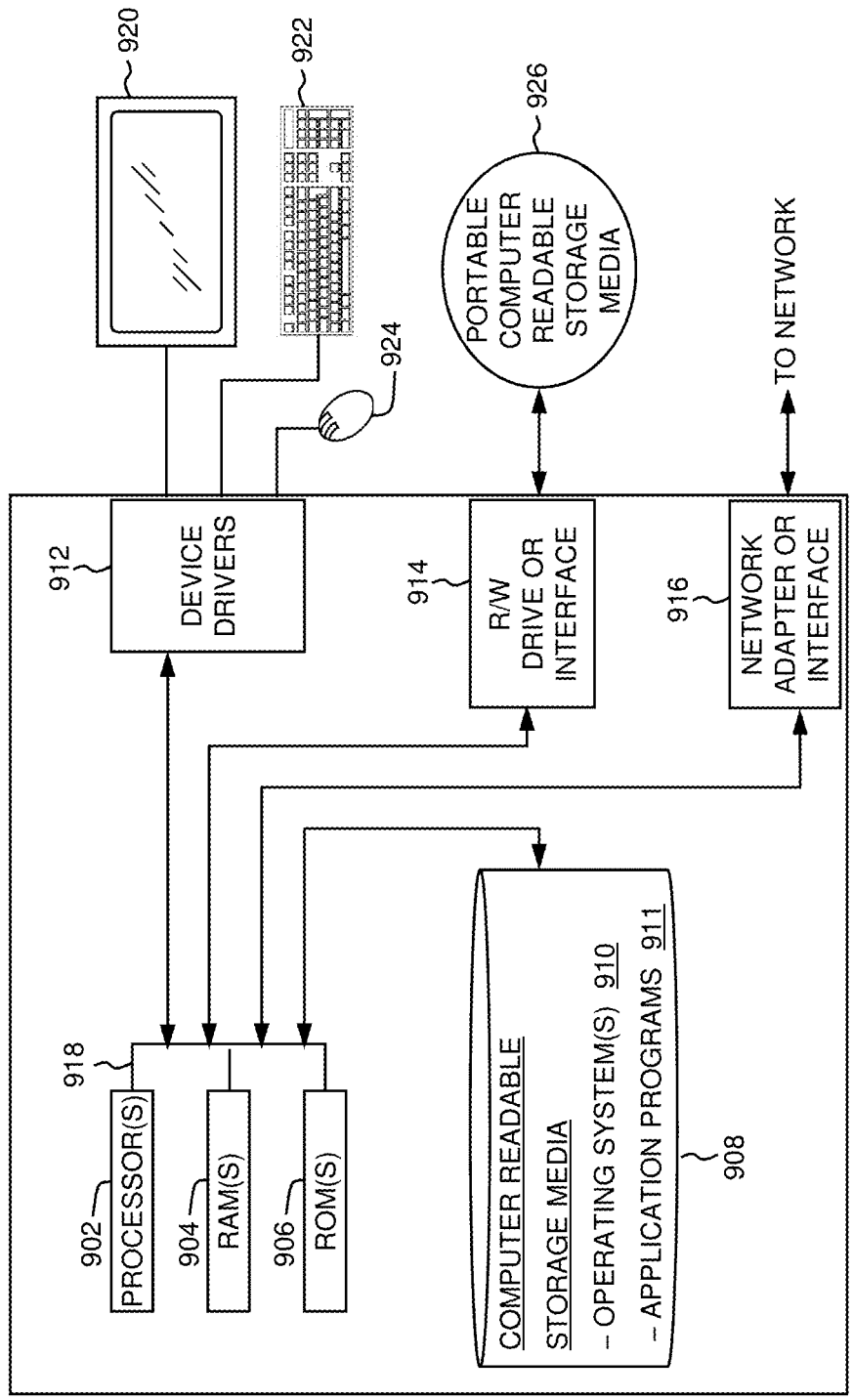
FIG. 5 depicts a block diagram of components of message requester, message owner, and certificate authority of FIG. 1, in accordance with an embodiment of the present invention.

Key repository 123 represents any sort of computer storage (such as represented in FIG. 5 by computer-readable RAM 904, computer-readable ROM 906, one or more computer readable storage media 908, read/write drive or interface 914, or other means) which is capable of storing a message requester public key and a message requester private key set for utilization by the message requester 120 in encryption and decryption of incoming messages. In various embodiments, message requester public keys and message requester private keys may be mathematical functions utilizing, by means of non-limiting example, a hash function. The message requester public key is made public and utilized to encrypt a message, while the message requester private key is kept private by the message requester 120. The message requester private key which is kept private by the message requester 120 is the only solution to decrypt an encrypted message encrypted with the message requester public key (at least in a time-effective manner). In initiating requests for messages, the message requester 120 transmits a message requester public key to certificate authority 140 for dissemination, as further discussed herein.

Message decryption module 125 represents any sort of software and/or hardware installed on message requester 120 for decryption of messages requested and received from message owner 130. After receipt of an encrypted message from message owner 130 (encrypted by message requester public key), the message requester private key (kept private by message requester 120) is utilized to decrypt the encrypted message.

Communication module 129 of message requester 120 is hardware and/or software responsible for communications between message requester 120 and message owner 130 as well as between message requester 120 and certificate authority 140, for communication of the message requester public key, receipt of encrypted messages, and as further discussed herein. Hardware associated with communication module 129 may include a network adapter or interface 916, such as a TCP/IP adapter card or wireless communication adapter (such as a 4G wireless communication adapter using OFDMA technology) such as described below in connection with FIG. 5.

In the exemplary embodiment, message owner 130 includes message storage 131, a signature decryption module 135, a multimedia comparison module 137, and a communication module 139.

Message storage 131 represents any sort of computer storage (such as represented in FIG. 5, computer-readable RAM 904, computer-readable ROM 906, one or more computer readable storage media 908, read/write drive or interface 914, or other means) for storage of files, programs, e-mails, financial transaction information, messages, or any other computerized data (collectively "stored messages") which must be transmitted to message requester 120 in a secure fashion, such as further described herein. Message storage 131 may also contain other stored messages which are not being presently transmitted, such as a batch of e-mails, even though only one of the emails is to be transmitted to message requester 120 as a message, as further discussed herein.

Signature decryption module 135 represents software and/or hardware to decrypt encrypted digital signatures (received as part of digital certificates) from certificate authority 140 included in digital certificates, as well as the included multimedia content (as further discussed herein). The decryption of the encrypted digital signatures by signature decryption module 135 occurs via utilization of a certificate authority public key transmitted from the certificate authority 140 to the message owner 130. After or while the certificate authority 140 transmits the digital certificate including the encrypted digital signature and multimedia content, etc., the certificate authority 140 also transmits a certificate authority public key to the message owner 130. The multimedia content may be embedded in the digital certificate, an extension to the digital certificate, attached to the digital certificate, or transmitted with the digital certificate in an equivalent fashion. The message owner 130 utilizes the received certificate authority public key to decrypt the encrypted digital signature along with the multimedia content. The decryption performed by the signature decryption module 135 may occur via an internet browser, a plug-in, or a third-party application. The decrypted digital signature and multimedia content is utilized as further discussed herein. The digital certificates received from the certificate authority 140 also contain the message requester public key, for encryption of messages to be sent to the message requester 120, also as further discussed.

Multimedia comparison module 137 represents software and/or hardware to determine whether decrypted multimedia content included in decrypted digital signatures decrypted by the signature decryption module 135 is valid. If the decrypted multimedia content is valid, this indicates the included message requester public key is valid, for further use as discussed. In determining whether the decrypted multimedia is valid, the decrypted multimedia may be automatically authenticated by the message owner 130, or the decrypted multimedia content presented to a user who authenticates, such as by confirming an image is correct, confirming a handwritten signature is valid, checking that audio plays correctly, checking that video plays correctly, scanning a bar code to confirm its validity, etc.

The communication module 139 of message owner 130 represents hardware and/or software responsible for communication between message owner 130 and message requester 120 for transmission of encrypted messages as well as between message owner 130 and certificate authority 140 for receiving of digital certificates (and certificate authority public keys, as further discussed herein). Hardware associated with communication module 139 may include a network adapter or interface 916, such as a TCP/IP adapter card or wireless communication adapter (such as a 4G wireless communication adapter using OFDMA technology) such as described below in connection with FIG. 5.

In the exemplary embodiment, certificate authority 140 includes certificate generator 141, archival repository 143, verification module 144, digital signature module 145, directory service 147, and communication module 149.

Certificate generator 141 represents software for generation of a digital certificate identifying an owner of certificate (here, message requester 120), as well as providing message requester public key to message owner 130 for encryption of messages to message requester 120. Digital certificates, in addition to the message requester public key, include a digital signature containing an encrypted message digest which itself includes encrypted multimedia content uniquely identifying the message requester 120 (and/or an individual or company associated with the message requester 120). The multimedia content may be embedded in the digital certificate, an extension to the digital certificate, attached to the digital certificate, or associated with the digital certificate in an equivalent fashion. Extensions or replacements to existing classes, objects, or other programming structures may facilitate digital certificates including multimedia content are specifically contemplated. Digital certificates are made available via the directory service 147 of certificate authority 140. Object identifiers may also be utilized in identifying multimedia content for the digital certificate.

Each digital certificate identifies the issuer of the digital certificate (i.e. the certificate authority 140), and may include some or all of the following:

TABLE 1

| | Digital Certificate<br>Digital Certificate |
|---|---|
| i. | Version Number |
| ii. | Serial Number |
| iii. | Digital Signature Algorithm ID |
| iv. | Certificate Authority Name |
| v. | Validity Before<br>    Not Before<br>    Not After |

TABLE 1-continued

| | Digital Certificate<br>Digital Certificate |
|---|---|
| vi. | Message Requester Name |
| vii. | Message Requester Public Key Info<br>    Message Requester Public Key Algorithm<br>    Message Requester Public Key |
| viii. | Digital Certificate Authority Identifier |
| ix. | Extensions<br>    Digital Certificate Signature Algorithm<br>    Digital Certificate Signature<br>    Message Requester Multimedia Graphical Content<br>    Message Requester Multimedia Media Content |

Archival repository 143 represents software for maintaining multimedia content uniquely identifying the message requester 120, for including in the digital certificate. The multimedia content may be audio content, video content, digital image(s), or otherwise. Digital images utilized include, by means of non-limiting example, an image of a handwritten signature from an individual associated with the message requester 120, a photo of an individual associated with the message requester 120, a logo/trademark/stamp of an individual or company associated with the message requester 120, a bar code, etc. Video content or audio content utilized in lieu of or in addition to the digital images may include, by means of non-limiting example, audio or video of or related to an individual or company associated with the message requester 120. Whichever multimedia content or combination of multimedia content is utilized, the multimedia content is transmitted in an encrypted fashion along with the digital signature to the message owner 130 in the digital certificate (also including the message requester public key and the certificate authority public key). When the message owner 130 decrypts the digital signature, the multimedia content is also decrypted, and an individual or computer software associated with the message owner 130 or message request 120 can assess the validity of the decrypted multimedia content, and thereby assess the validity of the digital signature, and therefore the digital certificate and message requester public key. Validity may be determined, for example, by determining whether the handwritten signature appears correct, whether the logo/trademark/stamp appears correct, whether the audio or video file is decrypted intact, whether the bar code scans correctly, etc. Benefits of the current invention even extend to the disabled, who can assess the validity of the multimedia content (and thereby the digital signature it is contained within, and associated message requester public key) simply by viewing or hearing the decrypted multimedia content.

Verification module 144 represents software for verification of the multimedia content such as stored within the archival repository 143. It is essential that before operation of the presently disclosed invention, the certificate authority 140 electronically or manually verifies that the multimedia content is, in fact, associated with the user or the company associated with the message requester 120. This is to confirm that when the user or company associated with the message requester 120 applies for permission to use services of the certificate authority 140 the user or company associated with the message requester 120 is legitimate. The permission to use the certificate authority 140 may be applied for once and remain valid, periodically renewed, or simply granted on as needed basis. If electronic verification is utilized, the certificate authority 140, may utilize software for facial recognition, voice recognition, auditory recognition, handwritten signature recognition, or image recognition may be used for the certificate authority 140 to electronically verify that the multimedia content is associated with the user or the company associated with the user or company associated with the message requester 120. If manual verification is used, an individual responsible for the certificate authority 140 may perform recognition, via utilization of photos, voice, video, of known origin, checking of licenses, passports or other official documents, checking of signatures, etc. Electronic means may also be utilized for recognition of a logo/trademark/stamp associated with the individual or company associated with the message requester 120. After verification of the origin of multimedia content is performed by the verification module 144, the certificate authority 140 begins utilizing the multimedia content to authenticate the message requester public key, as further discussed. Digital signature module 145 represents software and hardware for generation of digital signatures from digital certificates. After generation of a message digest including the multimedia content from the digital certificate, the digital signature module 145 encrypts the message digest and included multimedia content with a certificate authority private key to generate a digital signature. The certificate authority 140, in effect, utilizes the digital signature module 145 to sign each digital certificate with the certificate authority private key. The certificate authority private key may be, by means of non-limiting example, a hash function which is applied to the digital certificate. The generated digital signatures are further utilized as discussed herein. The multimedia content may be embedded in the digital certificate, an extension to the digital certificate, attached to the digital certificate, or transmitted with the digital certificate in an equivalent fashion.

Directory service 147 represents software and hardware to make message requester public key available to message owner 130. The message requester public key is transmitted within the digital certificate containing the digital signature, as further described herein. The message requester public key is utilized as further discussed, specifically for transmission of encrypted messages from the message owner 130 to the message requester 120. The directory service 147 also stores and makes available identification information identifying message requester 120.

Communication module 149 of certificate authority 140 represents hardware and/or software responsible for communication between certificate authority 140 and message requester 120, specifically receipt of the message requester public key, as well as communication between certificate authority 140 and message owner 130 for transmission of digital certificates and the certificate authority public key (as further discussed herein). Hardware associated with communication module 149 may include a network adapter or interface 916, such as a TCP/IP adapter card or wireless communication adapter (such as a 4G wireless communication adapter using OFDMA technology) such as described below in connection with FIG. 5.

Figure 2:
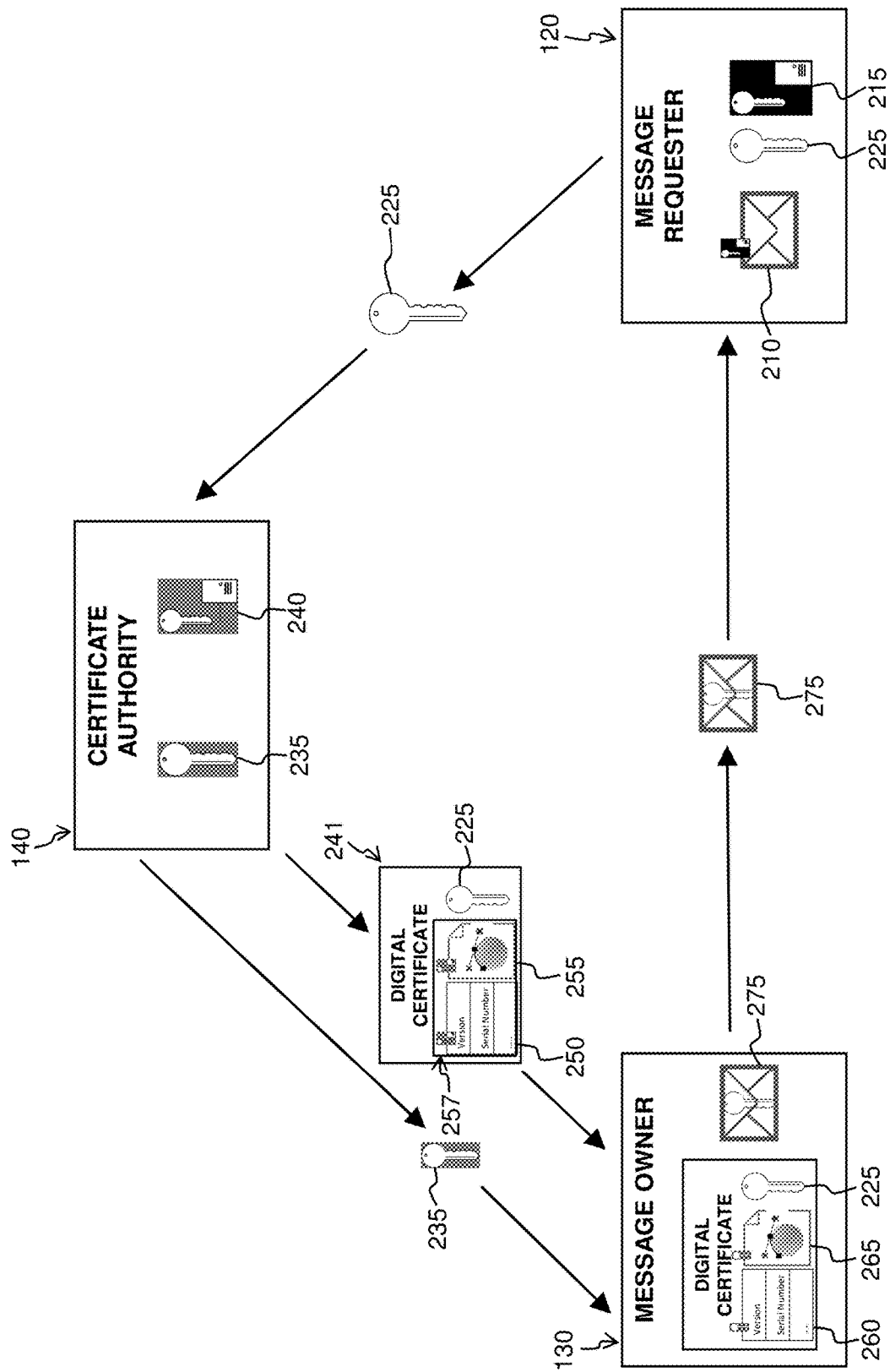
FIG. 2 is a functional block diagram illustrating transmission of encrypted messages utilizing digital signatures with multimedia content, in accordance with an embodiment of the present invention.

FIG. 2 is a functional block diagram illustrating transmission of encrypted messages utilizing digital signatures with multimedia content, in accordance with an embodiment of the invention. Message requester 120 desires to receive an unencrypted message 210 from message owner 130. Message requester 120 has a message requester private key 215 and a message requester public key 225. The message requester 120 transmits the message requester public key 225 to certificate authority 140 for distribution. The certificate authority 140 also has a certificate authority public key 235 and a certificate authority private key 240, as displayed. The certificate authority 140 generates a digital certificate 241 including the message requester public key 225 (as further discussed herein) and retrieves multimedia content 255 (also discussed herein). The certificate authority 140 then generates a message digest 250 from the digital certificate 241 including the multimedia content 255. The message digest 250 and multimedia content 255 is encrypted with the certificate authority private key 240 to generate a digital signature 257. The digital certificate 241 including the digital signature 257 (including message digest 250 and multimedia content 255), and message requester private key 225 are transmitted to a message owner 130. The certificate authority public key 235 is also transmitted to a message owner 130.

Continuing with regard to FIG. 2, the certificate authority public key 235, after receipt by the message owner 130, is utilized to decrypt the digital signature 257 to obtain the message digest 260 and multimedia image 265. The message owner 130 can then assess the validity of the message digest 260 and multimedia image 265, and, if both are valid, it is presumed the digital certificate 241 is valid as well as the received message requester public key 225. Once it is determined the message requester public key 225 is valid, the message owner 130 then utilizes the message requester public key 225 to encrypt the message 275 for transmission to the message requester 120. The message requester 120 utilizes the message requester private key 215 which has been maintained confidentially throughout the process to decrypt the message 210. Thus, the message 210 is received securely by the message requester 120.

Figure 3:
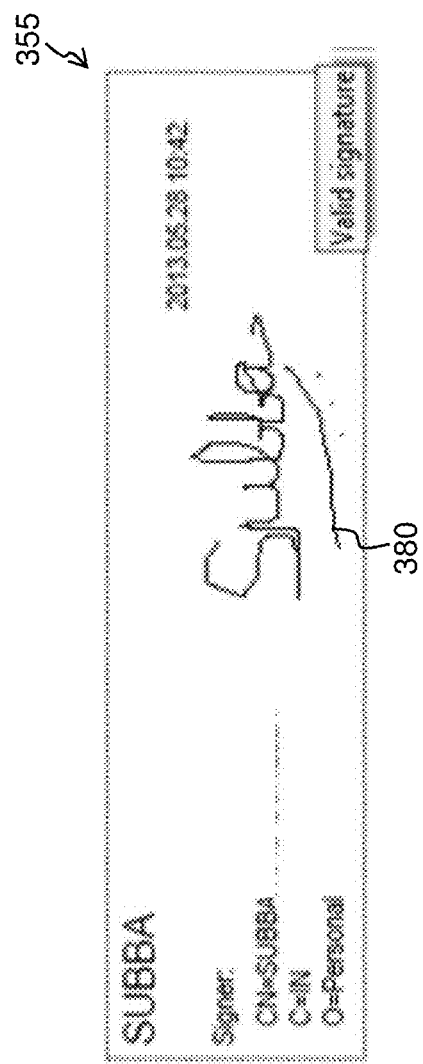
FIG. 3 is screenshot of a digital signature including multimedia content, in accordance with an embodiment of the present invention.

FIG. 3 is a screenshot of a digital signature 355 including multimedia content 380 decrypted by message owner 130 using the certificate authority public key 235. Multimedia content 380 here is a signature of an individual associated with message requester 120. Since the signature 380 decrypted successfully, (if it can be ascertained the signature "Subba" appears valid to the user of the presently disclosed invention), it indicates the associated digital signature 355 is valid, and therefore also the digital certificate (not shown here), and message requester public key (not shown here) are also valid.

Figure 4A:
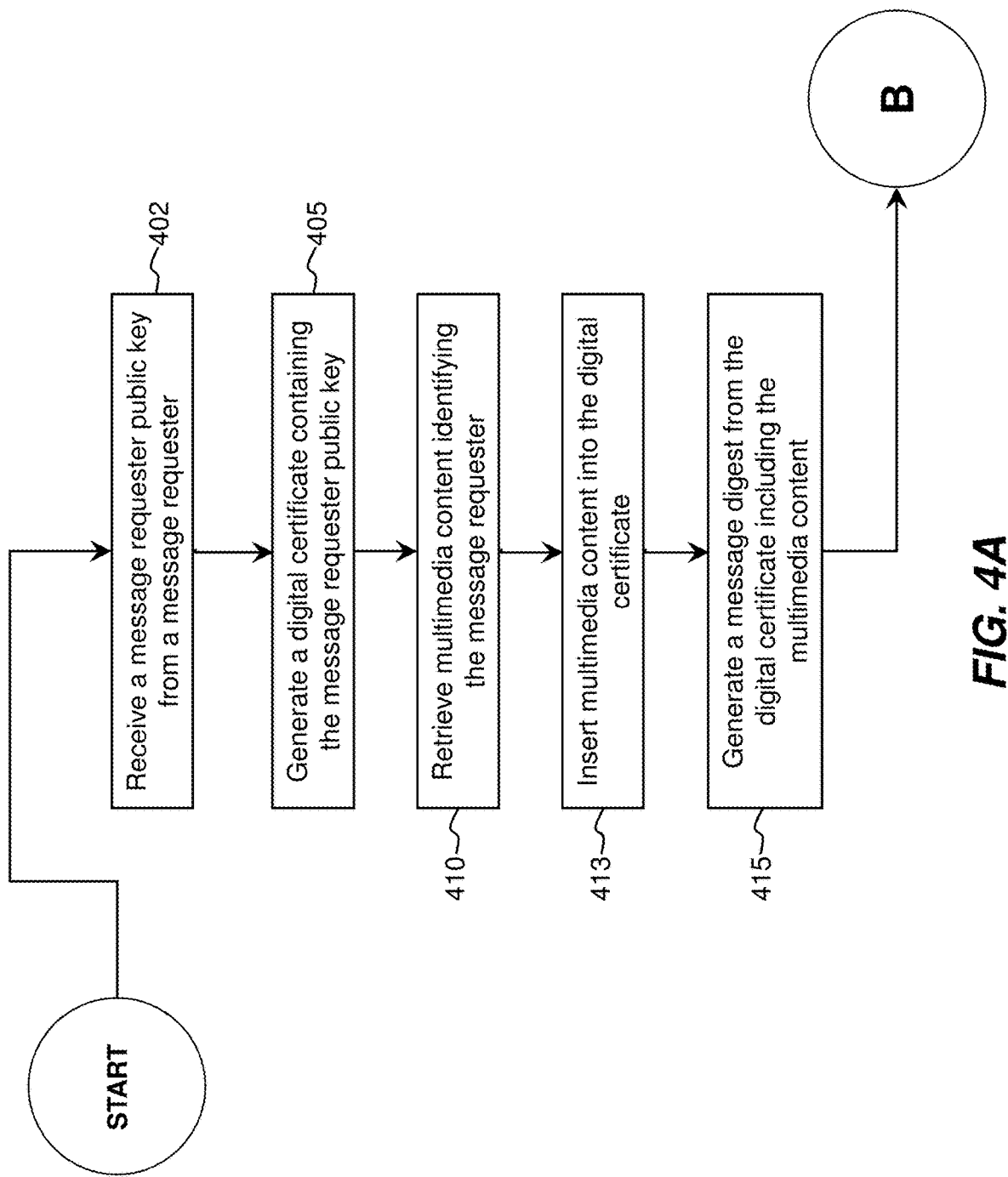
FIGS. 4A and 4B are a flowchart depicting operational steps that a hardware component of a hardware appliance may execute, in accordance with an embodiment of the invention.
Figure 4B:
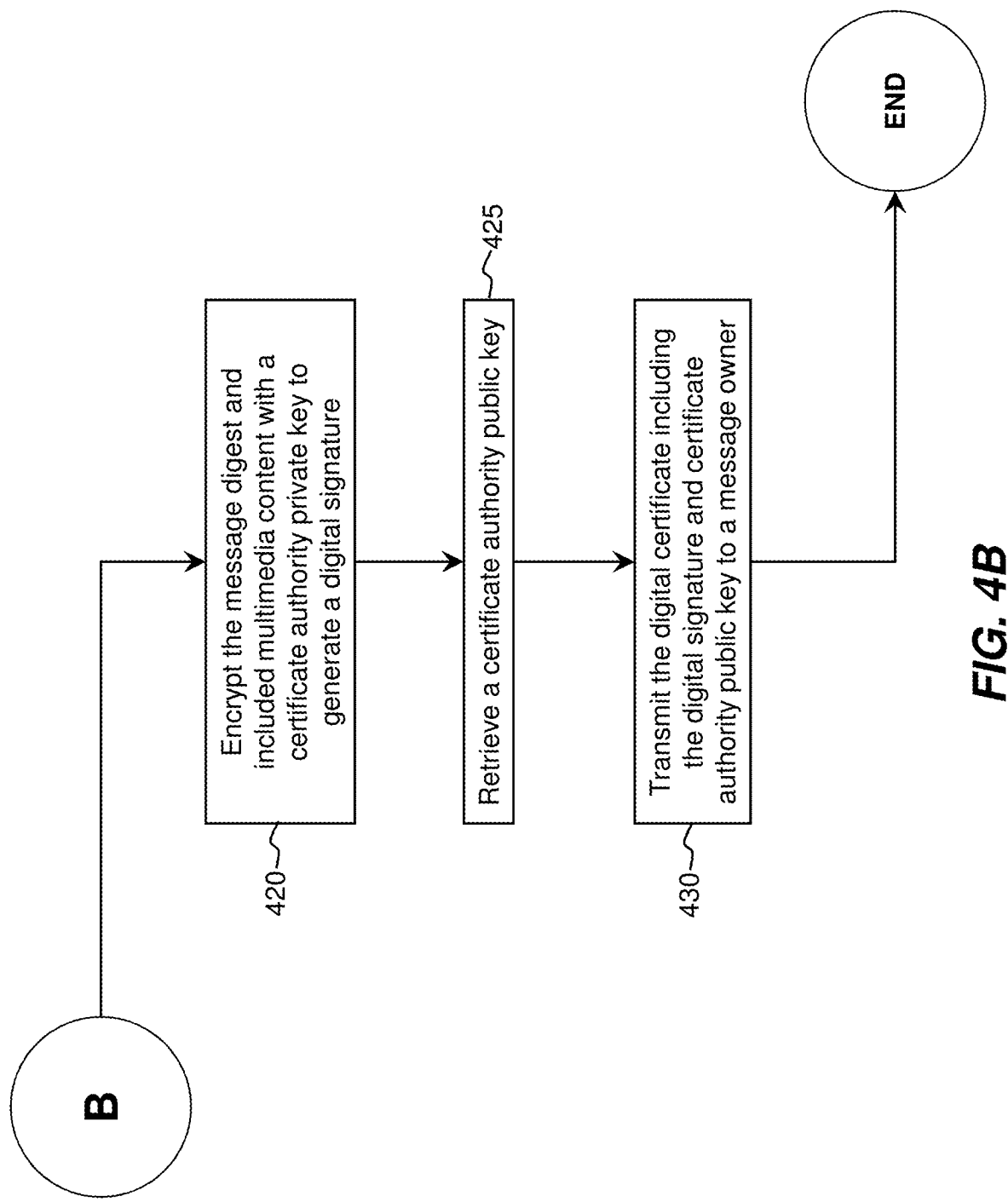

FIGS. 4A and 4B are a flowchart depicting operational steps that a hardware component, multiple hardware components, and/or a hardware appliance may execute, in accordance with an embodiment of the invention. As shown in FIG. 4A, at step 402 a message requester public key 225 is received by certificate authority 140 from the message requester 120. The message requester public key 225 may be received and stored by the certificate authority 140, or transmitted to the certificate authority 140 immediately before the certificate authority 140 uses it. At step 405, a digital certificate 241 containing the message requester public key 225 is generated by the certificate authority 140. At step 410, multimedia content 255 identifying the message requester 120 is retrieved by the certificate authority 140. As discussed above in connection with FIG. 1, the multimedia content is verified and stored by the certificate authority 140, or is obtained dynamically from the message requester 120. At step 413, multimedia content is inserted into the digital certificate. At step 415, a message digest 250 is generated from the digital certificate 241 including the multimedia content 255.

Continuing in FIG. 4B, at step 420, the certificate authority 140 encrypts the message digest 250 and multimedia content 255 with a certificate authority private key 240 to generate a digital signature 257. At step 425 a certificate authority public key 235 is retrieved by the certificate authority 140. At step 430 the digital certificate 241 including the digital signature 257 and certificate authority public key 235 are transmitted to the message owner 130 for further use as discussed herein for transmission of encrypted messages from the message owner 130 to the message requester 120.

FIG. 5 depicts a block diagram of components of message requester 120, message owner 130, and certificate authority 140 in the environment 100 for transmission of encrypted messages utilizing digital signatures with multimedia content, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Message requester 120, message owner 130, and certificate authority 140 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, the environment 100 for transmission of encrypted messages utilizing digital signatures with multimedia content, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Message requester 120, message owner 130, and certificate authority 140 may also include a R/W drive or interface 914 to read from and write to one or more portable computer readable storage media 926. Application programs 911 on computing device 106 may be stored on one or more of the portable computer readable storage media 926, read via the respective R/W drive or interface 914 and loaded into the respective computer readable storage media 908.

Message requester 120, message owner 130, and certificate authority 140 may also include a network adapter or interface 916, such as a TCP/IP adapter card or wireless communication adapter (such as a 4G wireless communication adapter using OFDMA technology). Application programs 911 on message requester 120, message owner 130, and certificate authority 140 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Message requester 120, message owner 130, and certificate authority 140 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a method, computer program product, and/or computer system at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, computer program products, and apparatus (systems) according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of method, system, and computer program product according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
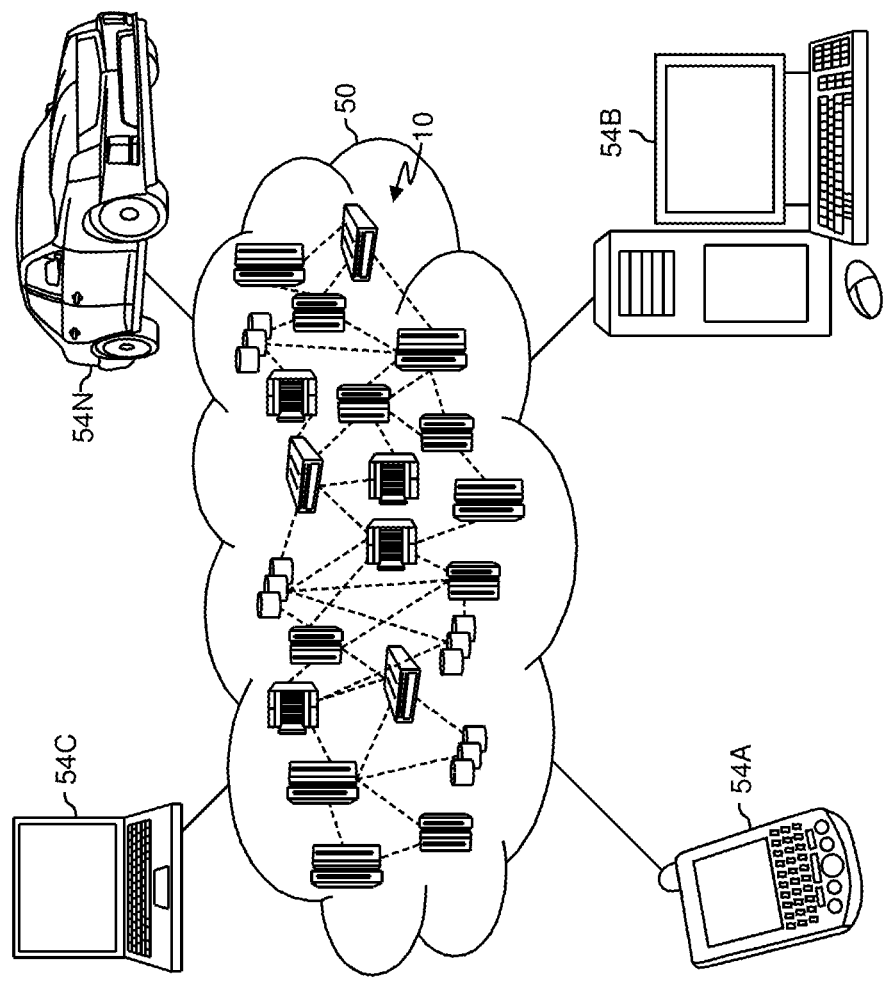
FIG. 6 depicts a cloud computing environment, in accordance with an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
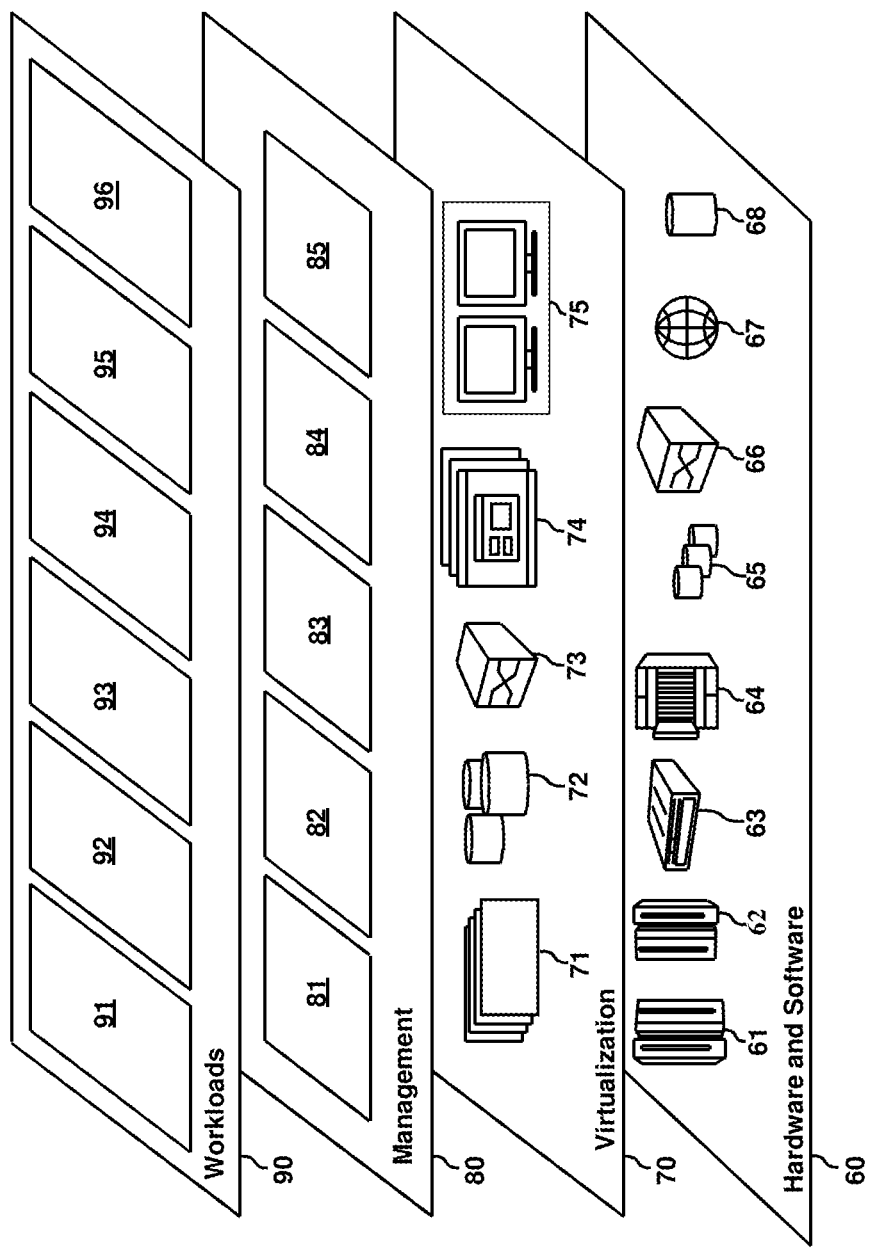
FIG. 7 depicts abstraction model layers, in accordance with an embodiment of the present invention.

Referring now to FIG. 7, a set of functional abstraction layers provided by cloud computing environment 50 (FIG. 5) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the environment 100 for transmission of encrypted messages utilizing digital signatures with multimedia content.

Based on the foregoing, a method, system, and computer program product have been disclosed. However, numerous modifications and substitutions can be made without deviating from the scope of the present invention. Therefore, the present invention has been disclosed by way of example and not limitation.

What is claimed is:

1. A method utilizing multimedia content in a digital signature to facilitate authenticate, the method comprising:
   receiving a message requester public key from a message requester;
   generating a digital certificate containing the message requester public key;
   retrieving multimedia content identifying the message requester;
   inserting the multimedia content into the digital certificate, wherein the multimedia content is embedded in the digital certificate or attached to the digital certificate, wherein the multimedia content is electronically verified using a technique which is selected from a group consisting of a facial recognition technique, voice recognition technique, an auditory recognition technique, a handwritten signature recognition technique and an image recognition technique;

generating a message digest from the digital certificate including the multimedia content;

encrypting the message digest and included multimedia content with a certificate authority private key to generate a digital signature;

retrieving a certificate authority public key; and transmitting the digital certificate including the digital signature and certificate authority public key to a message owner.

2. The method of claim 1, wherein the multimedia content contains audio content or video content.

3. The method of claim 1, wherein the multimedia content is a digital image, the digital image selectively one of the following: a handwritten signature, a bar code, a company logo, and a photo.

4. The method of claim 1, further comprising after utilizing the certificate authority public key to encrypt the multimedia content, decrypting the multimedia content and determining by an internet browser or a third-party application whether the decrypted multimedia content is intact.

5. The method of claim 1, wherein a hash function is utilized generate the message digest from the digital certificate.

6. The method of claim 2, wherein the message recipient public key, after transmission to the message owner, is utilized to encrypt a message for transmission to the message requester.

7. The method of claim 1, wherein the digital certificate identifies the certificate authority that issued the digital certificate.

8. The method of claim 1, wherein the multimedia content is stored as an extension of the digital certificate.

9. A computer program product to utilize multimedia content in a digital signature to facilitate authentication, the computer program product comprising:

one or more non-transitory computer-readable storage media and program instructions stored on the one or more non-transitory computer-readable storage media, the program instructions, when executed by the computing device, cause the computing device to perform a method comprising:

receiving from a certificate authority a digital certificate including message requester public key, a digital signature, a message digest, and multimedia content, wherein the multimedia content is embedded in the digital certificate or attached to the digital certificate, wherein the multimedia content is electronically verified using a technique which is selected from a group consisting of a facial recognition technique, voice recognition technique, an auditory recognition technique, a handwritten signature recognition technique and an image recognition technique;

receiving a certificate authority public key from a certificate authority;

decrypting the digital certificate using the certificate authority public key to obtain the message requester public key, the digital signature, the message digest, and the multimedia content;

determining whether the message requester public key is valid by determining whether the decrypted message digest and the decrypted multimedia image are valid; and utilizing the message requester public key to encrypt a message for transmission to a message requester.

10. The computer program product of claim 9, wherein the multimedia content contains audio content or video content.

11. The computer program product of claim 9, wherein the multimedia content is a digital image, the digital image selectively one of the following: a handwritten signature, a bar code, a company logo, and a photo.

12. The computer program product of claim 9, wherein when decrypting the digital certificate to obtain the message requester public key, the digital signature, the message digest, and the multimedia image, an internet browser or a third-party application is used to decrypt the digital certificate.

13. The computer program product of claim 9, wherein the digital certificate identifies the certificate authority than issued the digital certificate.

14. The computer program product of claim 9, wherein the multimedia content is stored as an extension of the digital certificate.

15. A computer system utilizing multimedia content in a digital signature to facilitate authenticate, the computer system comprising:

one or more computer processors;

one or more non-transitory computer-readable storage media;

program instructions stored on the computer-readable storage media for execution by at least one of the one or more processors, the program instructions comprising:

computer instructions to receive a message requester public key from a message requester;

computer instructions to generate a digital certificate containing the message requester public key;

computer instructions to retrieve multimedia content identifying the message requester;

computer instructions to insert the multimedia content into the digital certificate, wherein the multimedia content is embedded in the digital certificate or attached to the digital certificate, wherein the multimedia content is electronically verified using a technique which is selected from a group consisting of a facial recognition technique, voice recognition technique, an auditory recognition technique, a handwritten signature recognition technique and an image recognition technique;

computer instructions to generate a message digest from the digital certificate including the multimedia content;

computer instructions to encrypt the message digest and included multimedia content with a certificate authority private key to generate a digital signature;

computer instructions to retrieve a certificate authority public key; and computer instructions to transmit the digital certificate including the digital signature and certificate authority public key to a message owner.

16. The computer system of claim 15, wherein the multimedia content contains audio content or video content.

17. The computer system of claim 15, wherein the multimedia content is a digital image, the digital image selectively one of the following: a handwritten signature, a bar code, a company logo, and a photo.

18. The computer system of claim 15, further comprising program instructions to, after utilizing the certificate authority public key to encrypt the multimedia content, decrypt the multimedia content and determining by an internet browser or a third-party application whether the decrypted multimedia content is intact.

19. The computer system of claim 15, wherein a hash function is utilized generate the message digest from the digital certificate.

20. The computer system of claim 15, wherein the multimedia content is stored as an extension of the digital certificate.

* * * * *